(No Model.)
J. A. MOSHER.
ELECTRIC MOTOR.
No. 582,218. Patented May 11, 1897.
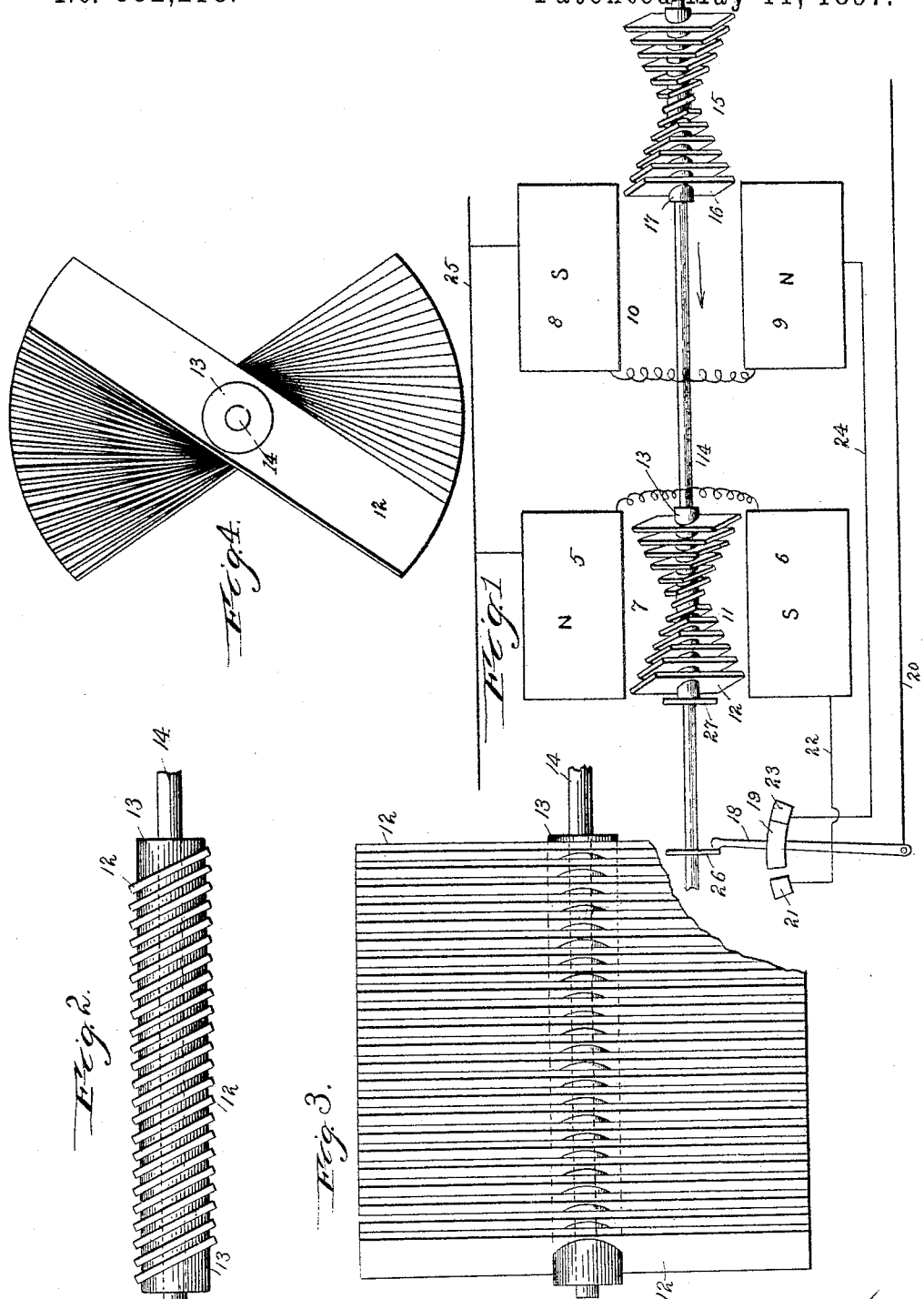
Witnesses:
Wm. M. Rheem
Harry White
Inventor:
John A. Mosher
by George Burry Atty.

UNITED STATES PATENT OFFICE.

JOHN A. MOSHER, OF CHICAGO, ILLINOIS.

ELECTRIC MOTOR.

SPECIFICATION forming part of Letters Patent No. 582,218, dated May 11, 1897.

Application filed February 9, 1893. Serial No. 461,679. (No model.)

*To all whom it may concern:*

Be it known that I, JOHN A. MOSHER, a citizen of the United States, residing at Chicago, in the county of Cook and State of Illinois, have invented certain new and useful Improvements in Electric Motors, of which the following is a specification, reference being had to the accompanying drawings, in which—

Figure 1 is a diagrammatic view showing my improved motor. Fig. 2 is a top or plan view of one of the armatures. Fig. 3 is a side elevation of one of the armatures. Fig. 4 is an end view of the armature arranged for rotary as well as longitudinal motion.

My invention relates to electric motors, and has for its object to provide a motor in which a reciprocating action of the armature may be secured either with or without a rotary motion. I accomplish this object as illustrated in the drawings and as hereinafter specified.

That which I regard as new will be set forth in the claims.

In the drawings, 5 and 6 indicate the poles of an electromagnet 7. 8 and 9 indicate the poles of an electromagnet 10. The magnets 7 and 10 are preferably arranged side by side, the north pole of the magnet 7 being placed opposite the south pole of the magnet 10. A sufficient space is left between the poles of the magnets to permit of the movement of the armatures between them, and when a rotary motion is desired the opposite faces of the poles are preferably curved in the arc of a circle to correspond to the curvature of the ends of the plates which constitute the armatures.

11 indicates the armature of the magnet 7, which armature is composed of a series of plates 12, mounted upon a sleeve 13, carried by a shaft 14, which is mounted in suitable bearings and preferably extends centrally between the opposite poles of the magnets 7 and 10, as best shown in Fig. 1. The shaft 14 is longitudinally movable in its bearings.

If desired, instead of mounting the plates 12 upon the sleeve 13 they may be mounted directly upon the shaft 14.

The plates 12 are arranged obliquely to the axis of the shaft 14, as best shown in Fig. 2. When only a longitudinal movement of the armatures is required, they are arranged in line with each other, as shown in Figs. 2 and 3. With this arrangement the successive plates overlap each other, so that when the armature is moved longitudinally to carry it into or out of the influence of the magnetic field the plates come within the influence of such magnetic field gradually, and consequently the pull of the magnets is increased and more constant. The action is somewhat similar to that described in my application for electric motor of even date herewith, except that the present action provides for a longitudinal as well as a rotary motion of the armature. If it is desired to secure a rotary motion also, the several plates 12 are arranged in a spiral form, as shown in Figs. 1 and 4, and substantially as described in my application above mentioned, except that the plates are still arranged obliquely to the shaft 14. By this arrangement a rotary as well as a longitudinal motion will be secured, and all the advantages of my peculiar arrangement of the plates retained.

15 indicates the armature of the magnet 10, which is also composed of a number of plates 16, mounted upon a sleeve 17, carried by the shaft 14. The armature 17 is in all respects similar to the armature 11, and it is so mounted upon the shaft 14 that when the armature 11 is opposite the poles of the magnet 7 the armature 15 will be at one side of the magnet 10 and almost out of the magnetic field of said magnet, as best shown in Fig. 1. When the armatures are in the position shown in Fig. 1, by magnetizing the magnet 10 and demagnetizing the magnet 7 the armature 15 will be moved in the direction indicated by the arrow in Fig. 1, while the armature 11 will move in a similar direction owing to the fact that they are both mounted upon the shaft 14. The armature 15 will thereby be moved completely into the magnetic field of the magnet 10, while the armature 11 moves away from the poles of the magnet 7. To secure such a cutting in and out of the magnets 7 and 10, and thereby provide for the longitudinal movement of the armatures, I provide a switch which, as here shown, consists of a lever 18, carrying a contact-plate 19, which lever is in circuit with some suitable generator by a wire 20.

21 indicates a contact-plate, which is connected by a wire 22 to the magnet 7.

23 indiates a second contact-plate, which is connected by a wire 24 to the magnet 10.

The plates 21 and 23 are placed on the opposite sides of the plate 19 and are in a position to be engaged by said contact-plate when the lever 18 is moved in one direction or the other, as shown in Fig. 1. The magnets 7 and 10 are connected by a wire 25 to the generator.

26 and 27 indicate plates carried by the shaft 14 and adapted to engage opposite sides of the lever 18 as the shaft 14 is reciprocated.

When the parts are arranged as shown in Fig. 1, the magnet 10 will be cut in through the contact-plates 19 and 23. This will cause the armatures to move in the direction indicated by the arrow in Fig. 1, and this movement will continue until the plate 27, carried by the shaft 14, shall strike the lever 18 and rock it, throwing the contact-plate 19 out of contact with the plate 23 and into contact with the plate 21. The magnet 7 will thus be cut in and the magnet 10 cut out, whereby the armatures will be caused to move in the opposite direction.

As above described, when the armatures are arranged as shown in Fig. 1—i. e., with the plates spirally arranged as well as obliquely placed to the axis of the shaft 14—a rotary motion as well as a reciprocating motion will be secured. If only a reciprocating motion is desired, the plates should be arranged obliquely to the axis of the shaft 14, but in line with each other, as shown in Fig. 2.

I do not wish to limit myself to any particular form of switch, as various forms of switches operated by the movement of the armatures may be devised, but the form shown is simple in construction, and for many purposes I find it to be preferable to a more complicated arrangement.

What I claim as my invention, and desire to secure by Letters Patent, is—

1. As a new article of manufacture, an armature for electromagnets, consisting of a number of plates arranged in succession upon a shaft obliquely to the axis thereof, substantially as described.

2. As a new article of manufacture, an armature for electromagnets consisting of a number of plates successively overlapping each other and mounted upon a shaft obliquely to the axis thereof, substantially as described.

3. As a new article of manufacture, an armature for electromagnets, consisting of a number of plates successively overlapping each other and mounted upon a shaft obliquely to the axis thereof, and adapted to be arranged in spiral form, substantially as described.

4. In an electric motor, the combination with a pair of independent electromagnets, of a rotatable armature for each of said magnets, said armatures being adapted to be reciprocated, and means for cutting said magnets into and out of circuit, substantially as described.

5. The combination with a pair of electromagnets of armatures for said magnets, said armatures consisting of a number of plates obliquely arranged, said armatures being adapted to be reciprocated, and means for alternately cutting said magnets into and out of circuit, substantially as described.

6. The combination with a pair of electromagnets of rotary armatures for said magnets, said armatures being adapted to be reciprocated, each of said armatures consisting of a number of plates arranged obliquely and in spiral form, and means for cutting said magnets into and out of circuit, substantially as described.

JOHN A. MOSHER.

Witnesses:
CHARLES H. JACKSON,
EDWIN M. MCKINNY.